United States Patent
Ota

(10) Patent No.: US 9,073,466 B2
(45) Date of Patent: Jul. 7, 2015

(54) VEHICLE SEAT

(71) Applicant: TOYOTA BOSHOKU KABUSHIKI KAISHA, Aichi-ken (JP)

(72) Inventor: Hiroki Ota, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 13/888,537

(22) Filed: May 7, 2013

(65) Prior Publication Data

US 2013/0300179 A1 Nov. 14, 2013

(30) Foreign Application Priority Data

May 9, 2012 (JP) ................................ 2012-107430

(51) Int. Cl.
*A47C 7/74* (2006.01)
*B60N 2/56* (2006.01)
*B60N 2/66* (2006.01)

(52) U.S. Cl.
CPC ................ *B60N 2/5664* (2013.01); *B60N 2/56* (2013.01); *B60N 2/5621* (2013.01); *B60N 2/5642* (2013.01); *B60N 2/5635* (2013.01); *B60N 2/5657* (2013.01); *B60N 2/66* (2013.01)

(58) Field of Classification Search
USPC ........................... 297/180.14, 180.13, 452.42
See application file for complete search history.

(56) References Cited

U.S. PATENT DOCUMENTS

| | | | | |
|---|---|---|---|---|
| 3,778,851 A | * | 12/1973 | Howorth | 5/423 |
| 4,880,271 A | * | 11/1989 | Graves | 297/284.4 |
| 5,102,189 A | * | 4/1992 | Saito et al. | 297/180.14 |
| 5,567,011 A | * | 10/1996 | Sessini | 297/284.7 |
| 5,924,766 A | * | 7/1999 | Esaki et al. | 297/180.13 |
| 5,927,817 A | * | 7/1999 | Ekman et al. | 297/452.47 |
| 6,179,706 B1 | * | 1/2001 | Yoshinori et al. | 454/120 |
| 7,607,739 B2 | * | 10/2009 | Browne et al. | 297/452.42 |
| 2005/0285438 A1 | * | 12/2005 | Ishima et al. | 297/452.42 |
| 2006/0208540 A1 | * | 9/2006 | Lofy et al. | 297/180.14 |
| 2009/0001785 A1 | * | 1/2009 | Swan et al. | 297/216.12 |
| 2009/0295200 A1 | | 12/2009 | Ito et al. | |
| 2012/0256451 A1 | | 10/2012 | Sahashi | |
| 2012/0261974 A1 | * | 10/2012 | Yoshizawa et al. | 297/452.42 |
| 2012/0267937 A1 | * | 10/2012 | Sahashi | 297/452.42 |
| 2013/0113265 A1 | | 5/2013 | Ota | |

FOREIGN PATENT DOCUMENTS

| | | |
|---|---|---|
| CN | 101279590 | 10/2008 |
| EP | 2511128 | * 10/2012 |

(Continued)

OTHER PUBLICATIONS

Chinese Office Action for CN App. No. 201310169332.8, dated Mar. 26, 2015, along with an English language translation thereof.

*Primary Examiner* — David E Allred
(74) *Attorney, Agent, or Firm* — Greenblum & Bernstein, P.L.C.

(57) ABSTRACT

There is provided a vehicle seat having an air passage formed to extend in an in-plane direction in a pad for supporting a body of an occupant. The vehicle seat includes a seat frame which supports a peripheral portion of the pad from a rear side thereof; and a support body which is supported by the seat frame and is configured to elastically support, from a rear side, a high-load portion of a center of the pad on which a body pressure of the occupant is concentrated, wherein the air passage is formed at a position avoiding the high-load portion of the pad supported by the support body.

8 Claims, 7 Drawing Sheets

(56) References Cited

FOREIGN PATENT DOCUMENTS

| | | | | |
|---|---|---|---|---|
| JP | 59081234 A * | 5/1984 | ............... | B60N 1/00 |
| JP | 2002-017510 | 1/2002 | | |
| JP | 2009-160261 | 7/2009 | | |
| JP | 2009-291310 | 12/2009 | | |
| JP | 2011-116303 | 6/2011 | | |
| WO | WO 9405187 A1 * | 3/1994 | ............... | A47C 7/74 |

* cited by examiner

VEHICLE SEAT

BACKGROUND OF THE INVENTION

1. Field of the Invention

The present invention relates to a vehicle seat. Specifically, the present invention relates to a vehicle seat including an air passage formed to extend in an in-plane direction in a pad for supporting a body of an occupant.

2. Description of Related Art

There has been known a vehicle seat having a fan for sending air from a rear side to a body of an occupant through a pad (see, for example, JP-A-2002-17510). In this vehicle seat, in order to distribute air from the fan broadly in an in-plane direction on a rear surface side of the pad such that the air can be sent into the pad, a plurality of hollow air passages are formed to extend in the in-plane direction in a rear surface of the pad.

However, in the above related-art technique, the air passages are provided in an installation area of a supporting spring suspended between seat frames, and particularly, provided in an installation area of the supporting spring for supporting a portion of the pad to which a body pressure tends to be applied. Therefore, the air passages may be clogged by squashing of the pad due to sitting pressure.

SUMMARY OF THE INVENTION

The present invention has been made to solve the above-mentioned problem, and an object of the present invention is to form an air passage in a pad such that it is difficult for the air passage to be squashed by sitting pressure, without damaging a comfortable supporting property during sitting.

According to an illustrative embodiment of the present invention, there is provided a vehicle seat having an air passage formed to extend in an in-plane direction in a pad for supporting a body of an occupant. The vehicle seat comprises: a seat frame which supports a peripheral portion of the pad from a rear side thereof; and a support body which is supported by the seat frame and is configured to elastically support, from a rear side, a high-load portion of a center of the pad on which a body pressure of the occupant is concentrated, wherein the air passage is formed at a position avoiding the high-load portion of the pad supported by the support body.

According to this configuration, the air passage is formed at a position avoiding the high-load portion of the pad. Therefore, even if the body pressure of the occupant is applied to the pad, it is difficult for the air passage to be squashed. In other words, when the body pressure is applied to the pad, the high-load portion on which the body pressure is particularly concentrated is largely squashed by supporting of the support body. However, since the air passage is formed at a position avoiding the high-load portion, it is difficult for the air passage to be squashed. That is, by the simple configuration to devise disposition of an air passage, it is possible to form an air passage such that the air passage is unlikely to be squashed by pressure during sitting, without damaging an appropriate supporting property during sitting.

In the above vehicle seat, the support body may include a supporting plate which surface-contacts the high-load portion of the pad from the rear side thereof, and a supporting spring which is configured to elastically support the supporting plate with respect to the seat frame. The air passage may be formed at a position avoiding the high-load portion of the pad which is surface-supported by the supporting plate.

According to this configuration, even if the air passage is provided to come at the installation area of the supporting spring, it is difficult for the air passage to be squashed. This is because a portion of the pad which is largely squashed by the body pressure of the occupant is the high-load portion supported by the supporting plate, and it is difficult for the portion supported by the supporting spring to be squashed. Therefore, it is possible to improve the supporting property by the support body while improving a ventilating function by freely providing the air passage to come at the installation area of the supporting spring.

In the above vehicle seat, the air passage may be formed along an outer circumferential edge of the high-load portion of the pad.

According to this configuration, the air passage is provided along the outer circumferential edge of the high-load portion of the center of the pad. Therefore, it is possible to set the air passage at a position close to the center where it is easier to send air to the body of the occupant. Therefore, it is possible to improve the ventilating function.

In the above vehicle seat, the high-load portion of the pad may be a portion for supporting a waist or a hip of the occupant.

According to this configuration, the waist or hip of the occupant is well supported by the support body. Therefore, ride quality becomes better. Further, since it is difficult for the air passage to be squashed, it is possible to achieve superior blowing performance.

DETAILED DESCRIPTION

Hereinafter, illustrative embodiments of the present invention will be described with reference to the accompanying drawings.

<First Illustrative Embodiment>

Figure 1:
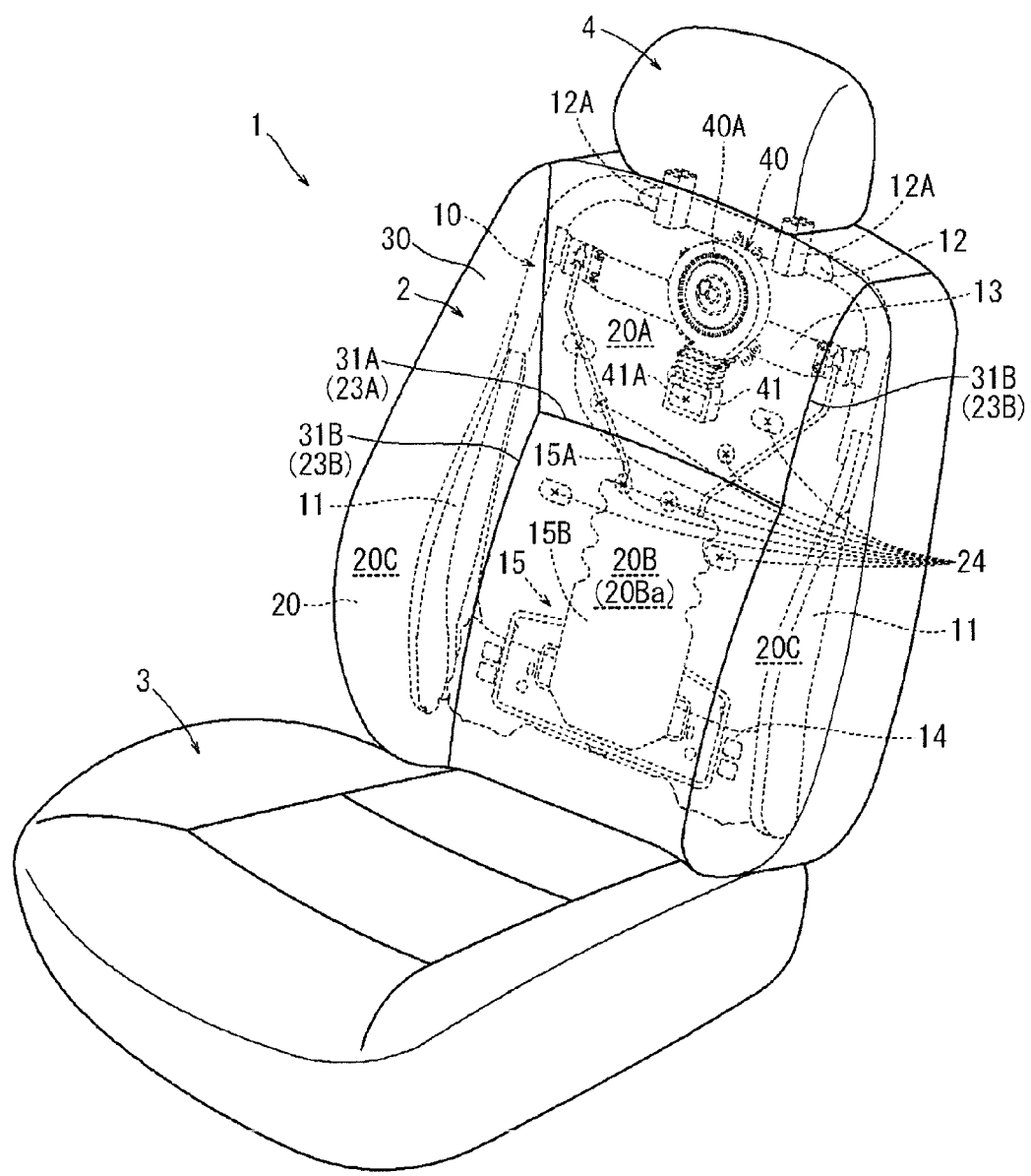
FIG. 1 is a perspective view illustrating an appearance of a vehicle seat according to a first illustrative embodiment.
Figure 2:
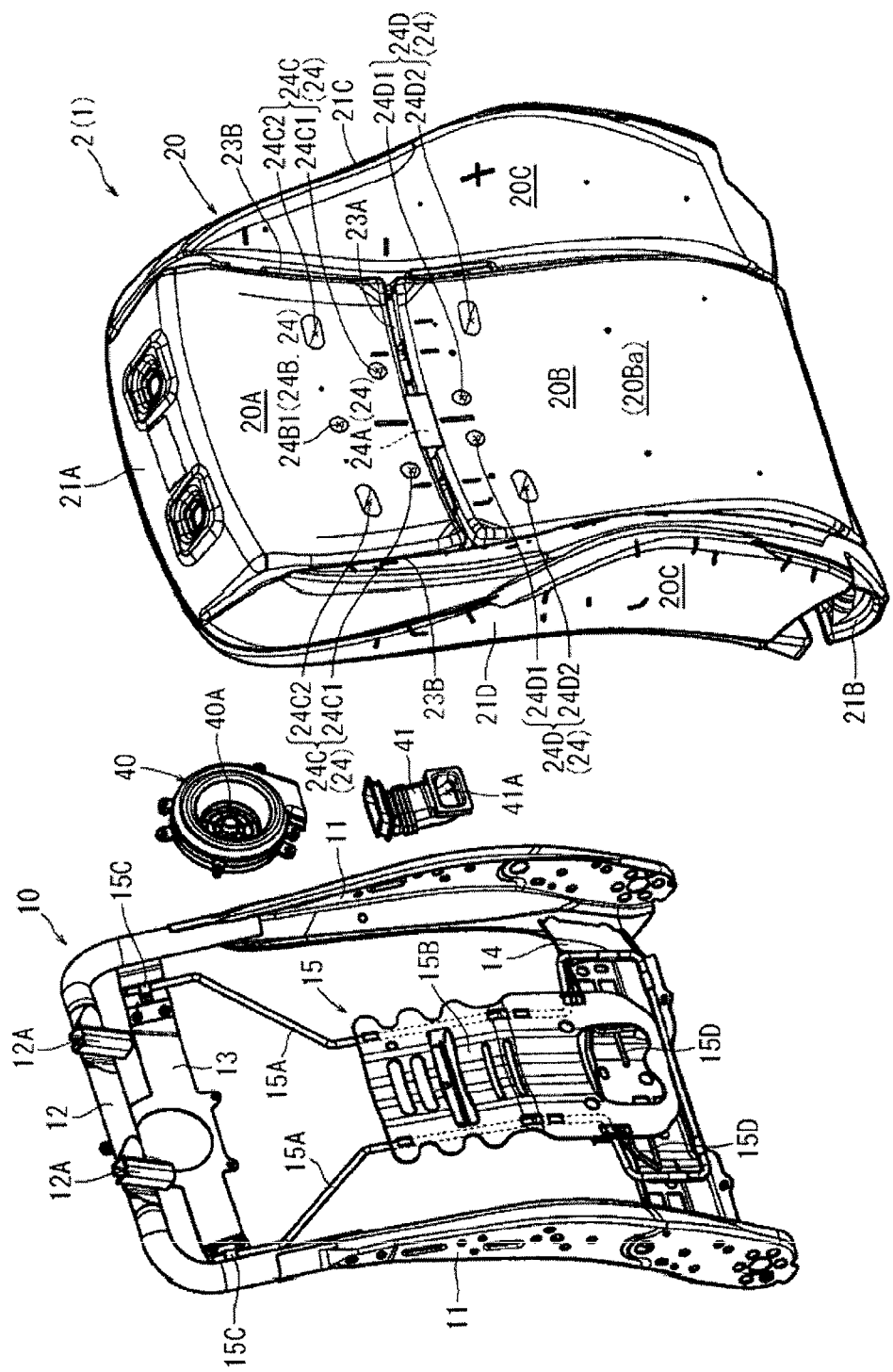
FIG. 2 is an exploded perspective view illustrating a seat back.

First, a configuration of a vehicle seat 1 according to a first illustrative embodiment will be described with reference to FIGS. 1 to 6. As shown in FIG. 1, the vehicle seat 1 according to the present illustrative embodiment is disposed as a driver's seat of an automobile, and includes a seat back 2 which functions as a backrest for an occupant, a seat cushion 3 which functions as a seating portion, and a headrest 4 which functions as a rest for a head. As shown in FIG. 2, the seat back 2 includes a centrifugal fan 40 which is disposed in the seat back 2 and can discharge air from an inside to a back of the occupant. Further, the seat back 2 includes an air passage 24 which is formed in a rear surface of a back pad 20 which functions as an internal cushion material and allows air from the fan 40 to flow dispersively and widely in an in-plane direction of the seat back 2.

Hereinafter, the specific configuration of the seat back 2 will be described in detail. As shown in FIGS. 1 and 2, the seat back 2 includes a back frame 10 which constitutes a skeleton of the seat back 2 and is assembled in a rectangular frame shape, the back pad 20 of a mat type which is made of a thick cushion material and assembled to a front surface of the back frame 10, and a fabric skin material 30 which covers an entire outer surface of the back pad 20. Here, the back frame 10 is an example of a seat frame, and the back pad 20 is an example of a pad. As shown in FIG. 2, the back frame 10 is configured in an inverse U shape by assembling left and right side frames 11, 11 made of vertically long steel plate materials, and an inverse U-shaped upper frame 12 made of a steel pipe and integrally and rigidly coupled to the upper end portions of the side frames 11, 11 in a bridging manner.

Further, an upper bridging frame 13 made of a horizontally long steel plate material is suspended between and rigidly coupled to both leg portions of the upper frame 12. A lower bridging frame 14 made of a horizontally long steel plate material is suspended between and rigidly coupled to the lower portions of the two side frames 11, 11. Therefore, the back frame 10 is configured in a rectangular frame shape by integrally assembling the upper frame 12, the two side frames 11, 11, the upper bridging frame 13, and the lower bridging frame 14.

Outer surfaces of the lower end sides of the two side frames 11, 11 are connected to a skeleton frame of the seat cushion 3 (see FIG. 1) through reclining mechanisms (not shown), respectively, so that the back frame 10 is supported. Therefore, the seat back 2 is connected with respect to the seat cushion 3 to allow adjustment of a backrest angle. The connection structure of the seat back 2 and the seat cushion 3 through the reclining mechanisms has a known configuration which is, for example, same as those disclosed in JP-A-2011-116303, and thus will not be described in detail.

As shown in FIG. 2, the upper frame 12 of the back frame 10 is solder-fixed with rectangular tube-shaped holders 12A, 12A at left and right positions of the center of the upper frame 12. The holders 12A, 12A function as holding members for mounting the headrest 4 shown in FIG. 1 on the seat back 2. Specifically, in the holders 12A, 12A, cylindrical resin supporting members (not shown) are inserted, respectively. Two rod-like stays provided at the lower portion of the headrest 4 are inserted into those supporting members from above, respectively, whereby the headrest 4 is fixed in a state where headrest 4 is mounted on the seat back 2.

Also, as shown in FIG. 2, between the upper bridging frame 13 and the lower bridging frame 14, a support body 15 is suspended to surface contact and elastically support a lower center portion 20B of the back pad 20 disposed on a front side of the support body 15, from a rear side. The support body 15 mainly includes a supporting spring 15A formed by bending one steel wire in a substantial U shape which is bilateral symmetrical, and a lumbar plate 15B having a vertically long plate shape and disposed on a front surface position of a lower area of the supporting spring 15A. Here, the lumbar plate 15B is an example of a support frame. The end portions of upper portion side of the supporting spring 15A bent in the substantial U shape are connected to the front surface portions of the two left and right sides of the upper bridging frame 13 by clips 15C, 15C, respectively such that the supporting spring 15A is vertically slidable. Also, two left and right end portions of the lower portion side of the supporting spring 15A bent in the substantial U shape are elastically supported from the rear side with respect to the front surface portion of the lower bridging frame 14 by fish mouth springs 15D, 15D (torsion springs) formed by winding steel wires in angular spiral shapes, respectively.

According to the above-mentioned configuration, the lower portion of the supporting spring 15A is always pressed toward the front side by the elasticity of the above-mentioned fish mouth springs 15D, 15D such that the lumbar plate 15B attached to the front surface of the supporting spring 15A is held in a state where the lumbar plate 15B is pressed against the rear surface of the back pad 20. In this state, both end portions of the upper portion side of the supporting spring 15A are supported with respect to the upper bridging frame 13 from the rear side, and both end portions of the lower portion side of the supporting spring 15A are elastically supported with respect to the lower bridging frame 14 from the rear side by the fish mouth springs 15D, 15D. Therefore, the supporting spring 15A elastically supports the back pad 20 from the rear side (back side) by the support of the supporting spring 15A and the elasticity (rigidity) of the supporting spring 15A.

If the occupant leans on the seat back 2, the supporting spring 15A receives the load of the occupant through the back pad 20, and presses the fish mouth springs 15D, 15D to be bent toward the rear side such that the entire seat back 2 is pressed and bent toward the rear side. More specifically, if the supporting spring 15A receives the load, the upper end portions of the supporting spring 15A slides upward with respect to the clips 15C, 15C with using the upper end portions supported by the clips 15C, 15C as fulcrums and the lower end portion of the supporting spring is pressed to be bent straight toward the rear side such that the fish mouth springs 15D, 15D are folded toward the rear side.

In general, it is known that if an occupant leans on the seat back 2, a high body pressure is concentrated on a surface portion on which the waist of the occupant is put, and thus the corresponding surface portion (waist supporting portion 20B*a*) of the back pad 20 is pressed to be bent largely toward the rear side. For this reason, in order to improve the supporting property of the waist supporting portion 20B*a* of the back pad 20 to which a high body pressure is applied as described above, the plate-like resin lumbar plate 15B is attached to the lower area of the supporting spring 15A such that the lumbar plate 15B comes into wide surface contact with the waist supporting portion 20B*a* from the rear side and elastically support the waist supporting portion 20B*a*. Also, as described above, the two fish mouth springs 15D, 15D capable of elastically supporting the lower end portions of the supporting spring 15A with respect to the lower bridging frame 14 from the rear side are attached to the lower end portions of the supporting spring 15A. Therefore, due to the supporting by those components, the supporting force of an area portion to support the waist supporting portion 20B*a* of the back pad 20 of the support body 15 is enhanced, and the waist supporting property of the seat back 2 is improved. Here, the waist supporting portion 20B*a* is an example of a high-load portion at a center of the back pad 20.

As described above, the supporting spring 15A is formed by bending a steel wire in the substantial U shape which is bilateral symmetrical. More specifically, the supporting spring 15A is formed by bending a steel wire in a shape capable of widely contacting and supporting the lumbar plate 15B from the rear side as will be described below. In other words, the supporting spring 15A is formed by bending the steel wire such that the lower end portion of the supporting spring 15A for supporting the lower area of the lumbar plate 15B has a rectangular frame shape which is horizontally longer than the lumbar plate 15B, and portions for supporting the intermediate portion and upper area of the lumbar plate 15B on the upper side of the lower end portion extend straight upward along the edge portions of both sides of the rear surface of the lumbar plate 15B from the center of the upper portion of the rectangular frame-shaped portion. Also, portions of the supporting spring 15A above the portion for supporting the lumbar plate 15B are bent to extend obliquely upward toward the left and right sides, respectively, and the obliquely upward ends are bent again to extend straight upward and are attached to the upper bridging frame 13 by the clips 15C and 15C such that the supporting spring is vertically slidable.

The lower frame portion of the supporting spring 15A for supporting the lower area of the lumbar plate 15B is attached to be elastically supported with respect to the lower bridging frame 14 from the rear side at a wide-width position where the supporting spring 15A protrudes outward in a horizontal direction from the lumbar plate 15B by the fish mouth springs 15D, 15D. Also, the upper end portions of the supporting spring 15A extending upward from the lumbar plate 15B are attached to the upper bridging frame 13 by the clips 15C, 15C with a width interval wider than the horizontal width of the lumbar plate 15B. Therefore, the upper end side and lower end side of the supporting spring 15A are supported with wide supporting widths with respect to the back frame 10, respectively, and the supporting spring 15A is stably supported at two positions in a width direction such that it is difficult to twist the lumbar plate 15B provided at the center position in the width direction.

Also, the portions of the supporting spring 15A extending obliquely upward outward in the horizontal direction from the portions of the supporting spring 15A for supporting the lumbar plate 15B are provided to be capable of supporting the vicinities of the shoulder blades of the occupant by the oblique disposition, and the shoulder blades to which the second highest body pressure after the waist are well supported by direct supporting of the supporting spring 15A from the rear side. The lumbar plate 15B is formed such that the edge portions of the left and right sides of the upper area of the lumbar plate undulate like wavers, and is likely to be bent toward the rear side by a pressing force of the back of the occupant. As described above, the edge portions of the lumbar plate 15B have the easily bendable portions. Therefore, a rapid change in supporting force which occurs between a portion with the lumbar plate 15B and a portion without the lumbar plate 15B is relaxed such that the occupant does not feel a feeling of strangeness according to a rapid change in supporting force.

Now, the configuration of the back pad 20 will be described. As shown in FIG. 2, the back pad 20 is formed by foaming a urethane resin in a thick mat form, and is set to cover the back frame 10 from above. Specifically, the back pad 20 is assembled with the back frame 10 from above so as to widely cover the entire frame shape of the back frame 10 from the front side, and cover the side frames 11, 11, the upper frame 12, and the lower bridging frame 14 from their outer circumference sides and rear sides with the surrounding portions 21A to 21D (see FIG. 3) extending backward from the upper, lower, left, and right edge portions of the back pad such that the side frames 11, 11, the upper frame 12, and the lower bridging frame 14 are protected.

Figure 4:
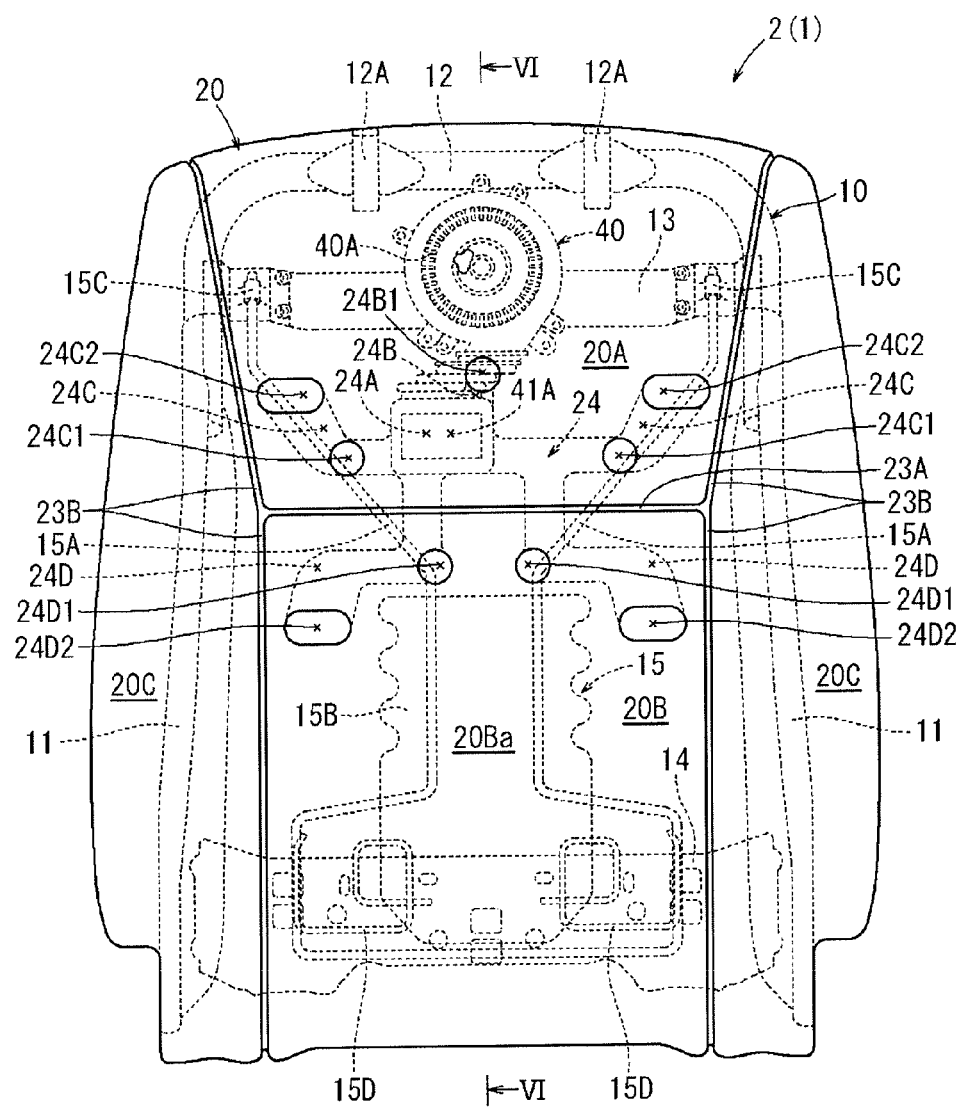
FIG. 4 is a front view illustrating the seat back.

After the back pad 20 is assembled with the back frame 10 as described above, the skin material 30 (see FIG. 1) is put to cover the entire surface of the back pad 20 and is stretched tightly, whereby the back pad 20 is pressed against the back frame 10 by the tightly stretching force of the skin material 30 such that the back pad 20 is fixed and held. Therefore, as shown in FIG. 4, the outer circumferential portion of the back pad 20 is supported from the rear side by the frame shape of the back frame 10, and the center portion of the back pad 20 is surface-supported from the rear side by the above-mentioned support body 15, so that the backrest load of the occupant can be elastically and softly received from the rear side.

Specifically, as shown in FIG. 2, the back pad 20 includes an upper center portion 20A for supporting the upper portion of the back of the occupant such as the shoulder blades, a middle center portion 20B for supporting the lower portion of the back of the occupant from the center of the back to the waist, and two side portions 20C, 20C for supporting both side portions of the back of the occupant from both outer sides. The upper center portion 20A and the lower center portion 20B are formed in a flat plate shape with relatively a little ups and downs, and specifically are formed in a shape in which their surfaces have recess shapes gently curved toward the formation position of a recess-shaped horizontal stretching groove 23A extending in a horizontal line shape at the center and becoming the border between the upper center portion 20A and the lower center portion 20B. More specifically, the curved surfaces of the upper center portion 20A and the lower center portion 20B have shapes in which the center recesses in the width direction deepen gradually in the height direction, toward the formation position of the horizontal stretching groove 23A to be the border between the upper center portion 20A and the lower center portion 20B.

The center area portion of the lower center portion 20B in the width direction is formed as the waist supporting portion 20Ba to come into contact with the waist of the occupant such that the surface shape is a curved surface shape gently bulging forward in a mountain shape. This curved surface shape and the recess-like curved surface shapes of the upper center portion 20A and the lower center portion 20B form the entire center portion of the back pad 20, which draws a gently undulating S-shaped curve which fits to the shape of the back of the occupant.

Also, the two side portions 20C, 20C are formed to bulge forward in a mountain shape, from the formation positions of recess-like vertical stretching grooves 23B, 23B which are the borders between the side portions 20C, 20C, and the upper center portion 20A and the lower center portion 20B and extend in vertical line shapes, toward the outer sides of the side portions 20C, 20C. The side portions 20C, 20C support the side portions of the back of the occupant from both outer sides by those mountain shapes. Specifically, the mountain shapes of the side portions 20C, 20C are most bulging at positions slightly higher than portions corresponding to a height (the formation area of the waist supporting portion 20Ba) to support the waist in the side portions 20C, 20C. Therefore, the side supports can effectively support the sides of the back of the occupant from both outer sides at positions slightly higher than the waist of the body where the body tends to shake.

Meanwhile, the horizontal stretching groove 23A and the vertical stretching grooves 23B, 23B formed on the outer surface of the back pad 20 function as pulling grooves for stretching and fixing a seam portion 31A and seam portions 31B, 31B of the skin material 30 (see FIG. 1) formed along the lines of the grooves. Those stretching structures have known configurations which are, for example, same as those disclosed in JP-A-2009-160261, and thus will not be described in detail. Due to those stretching structures, the skin material 30 is brought into wide surface contact with the back pad 20 and is stretched tightly in a good looking state such that even if portions of the back pad 20 with ups and downs among the upper center portion 20A, lower center portion 20B, and two side portions 20C and 20C are covered with the skin material 30, floating or crinkling does not occur between the corresponding portions and the outer surface of the back pad 20.

Figure 3:
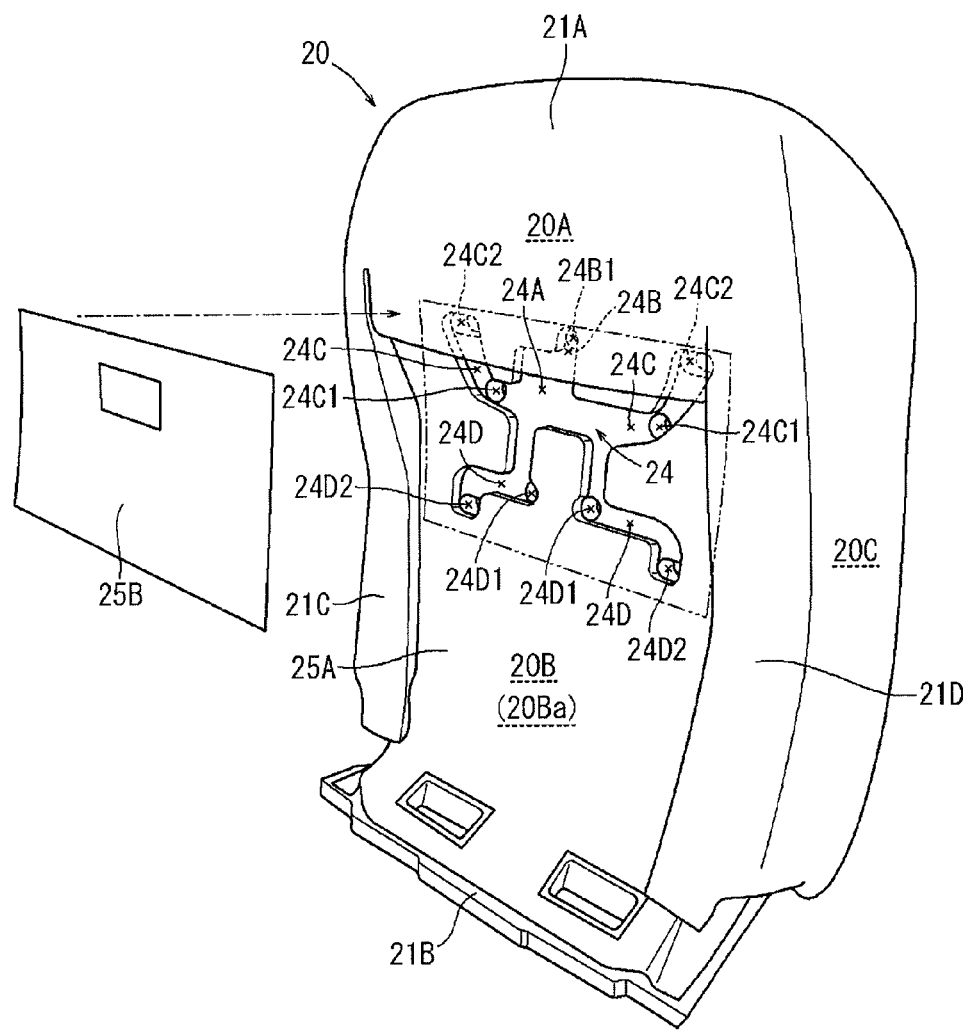
FIG. 3 is a perspective view illustrating a back pad as seen from a rear surface side.

As shown in FIG. 3, on the rear surface of the back pad 20, the recess-like air passage 24 allowing air from the fan 40 (see FIG. 2) flow dispersively and widely in the in-plane direction of the back pad 20 is formed over each area of the upper center portion 20A and the lower center portion 20B. Now, the detailed configuration of the air passage 24 will be described in detail. The air passage 24 is configured by forming a partial recess-like passage in the rear surface of the back pad 20 and covering the rear surface of the back pad 20 with a non-permeable cover sheet 25B such that air dispersively flows in the closed internal passage. When the back pad 20 is foamed, ground fabric 25A such as non-woven fabric is set on a mold for forming the design surface of the rear surface side of the back pad 20, and the air passage 24 is integrally foamed such that the rear surface of the back pad 20 is impregnated with the ground fabric 25A and the ground fabric 25A is cured to be hard such that it is difficult for the air passage to be squashed. In the meantime, the cover sheet 25B is provided to overlap the lumbar plate 15B on which a body pressure is applied. Therefore, a lower end of the cover sheet 25B is pressed against the back pad 20 such that the cover sheet 25B is less likely separated.

Specifically, the air passage 24 includes a connection opening 24A which is connected to an outlet 41A of a duct 41 connected to the fan 40 (see FIG. 2), an upper center air passage 24B which extends upward from the connection opening 24A, upper side air passages 24C, 24C which extend leftward and rightward from the connection opening 24A, respectively, and are bent to extend upward, and lower side air passages 24D, 24D which extend downward from two left and right positions of the connection opening 24A, are bent to extend leftward and rightward, respectively, and are bent to extend downward. The connection opening 24A is formed in a rectangular dent shape in the area of the upper center portion 20A of the back pad 20. Also, the upper center air passage 24B and the upper side air passages 24C, 24C are formed to extend in the in-plane direction in the area of the upper center portion 20A of the back pad 20. Further, the lower side air passages 24D, 24D are formed to extend downward from the formation position of the connection opening 24A and extend in the in-plane direction in the area of the lower center portion 20B of the back pad 20.

At the upward extending end portion of the upper center air passage 24B, a through-hole 24B1 having a round hole shape is formed through the back pad 20 in the thickness direction. Also, in the portions of the upper side air passages 24C, 24C bent upward, through-holes 24C1, 24C1 having round hole shapes are formed through the back pad 20 in the thickness direction, respectively. Further, in the upward extending end portions of the upper side air passages 24C, 24C, through-holes 24C2, 24C2 having hole shapes long in the width direction are formed through the back pad 20 in the thickness direction, respectively. Furthermore, in the portions of the lower side air passages 24D, 24D bent leftward and rightward, through-holes 24D1, 24D1 having round hole shapes are formed through the back pad 20 in the thickness direction, respectively. In addition, in the downward extending end portions of the lower side air passages 24D, 24D, through-holes 24D2, 24D2 having long hole shapes in the width direction are formed through the back pad 20 in the thickness direction, respectively.

Figure 5:
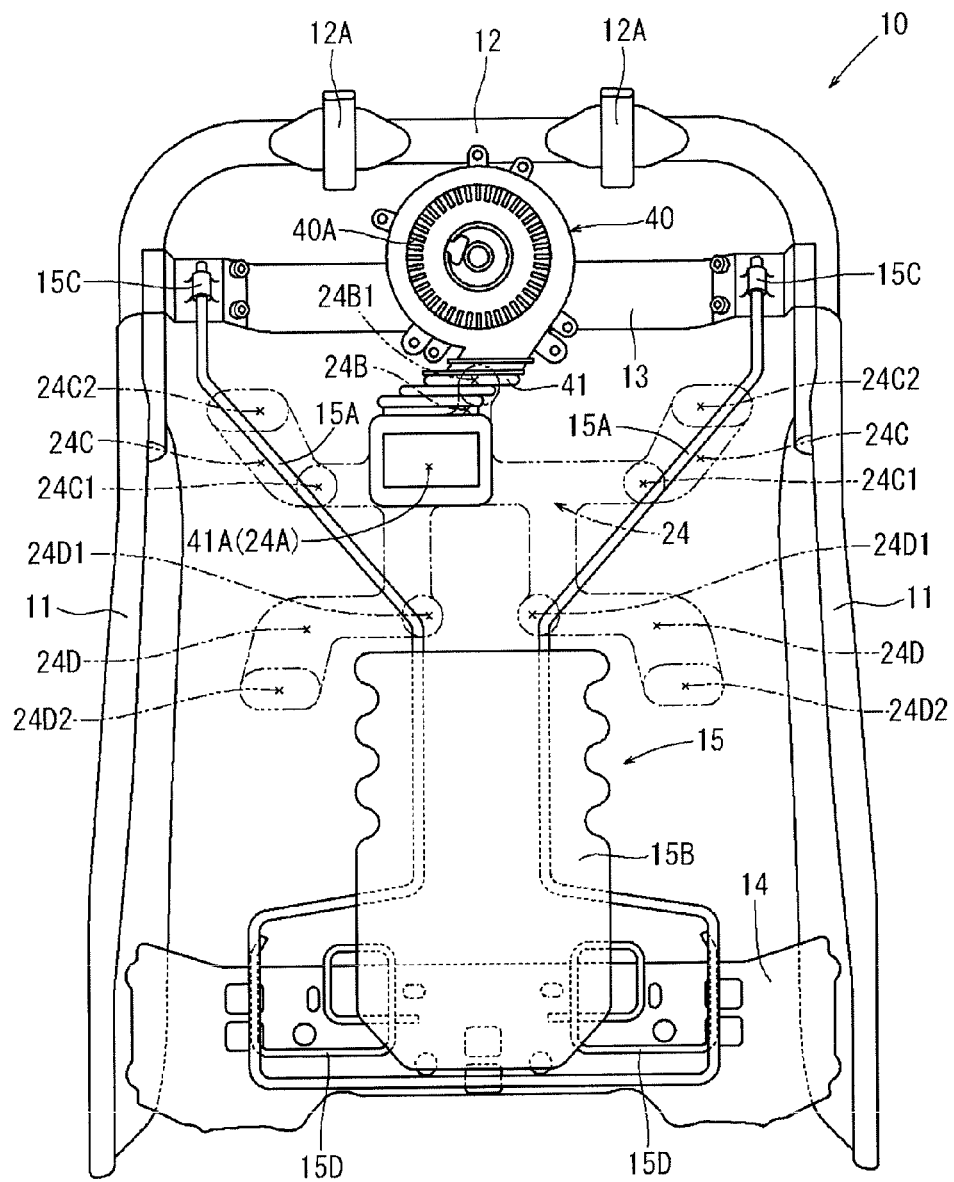
FIG. 5 is a front view illustrating a back frame.
Figure 6:
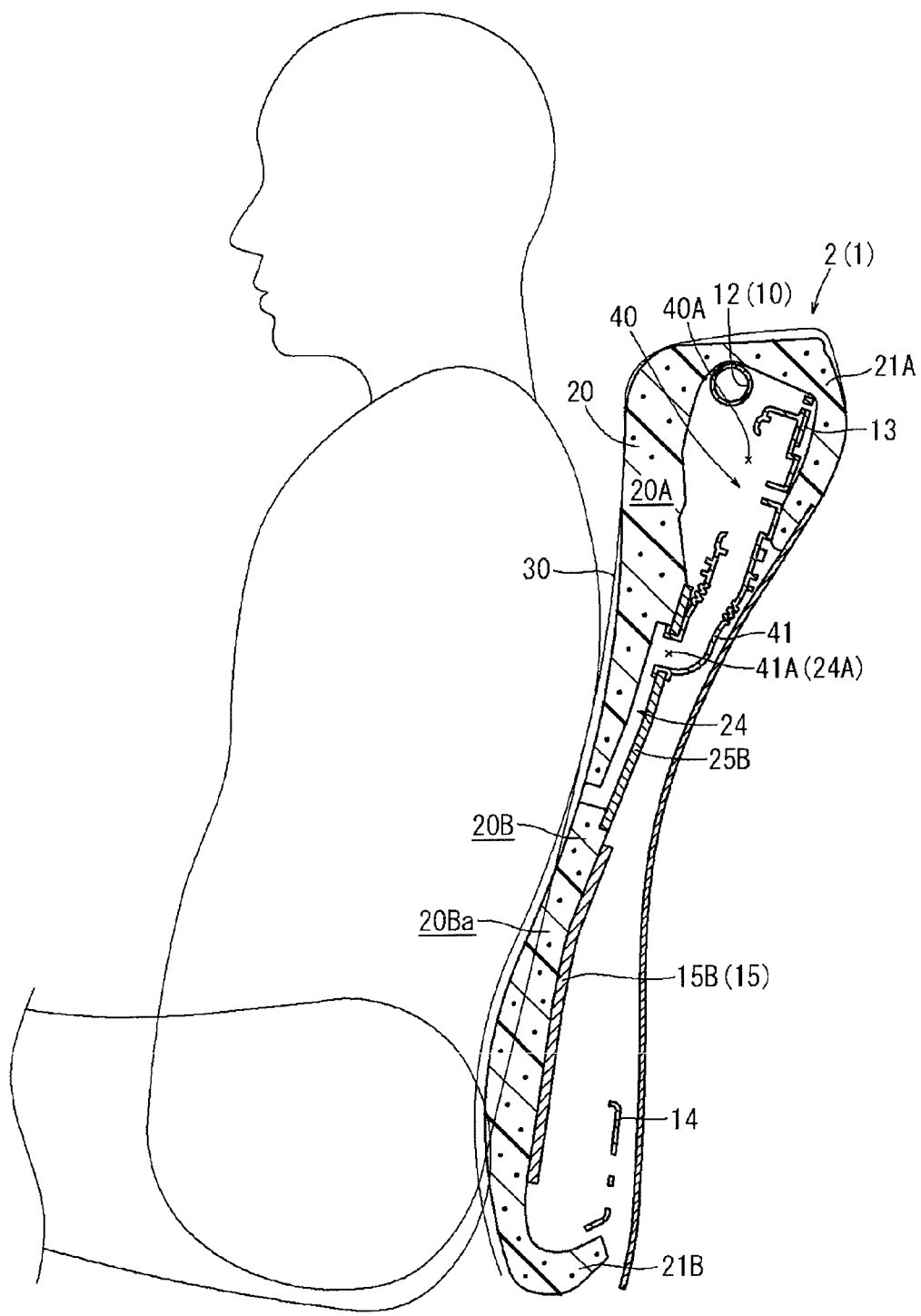
FIG. 6 is a cross-sectional view taken along a line VI-VI of FIG. 4.

As shown in FIGS. 4 and 5, the through-holes 24D1, 24D1 which are formed at the bent portions of the lower side air passages 24D, 24D are formed at positions corresponding to the portions of the supporting spring 15A for supporting the lumbar plate 15B bent on the upper side from the lumbar plate 15B to extend obliquely outward in the horizontal direction (to overlap the corresponding portions of the supporting spring 15A in a front view). Also, the through-holes 24C1, 24C1 which are formed at the bent portions of the upper side air passages 24C, 24C are formed at positions corresponding to the bent points of the supporting spring 15A bent to be straight upward after extending obliquely upward (to overlap the corresponding bent points in a front view). Although the lower side air passages 24D, 24D and the upper side air passages 24C, 24C are formed to come at the disposition place of the supporting spring 15A, since (a) the upper ends of the supporting spring 15A are supported, (b) the supporting spring 15A is located on the rear side of the lumbar plate 15B, and (c) a portion of the supporting spring 15A upper than the portion for supporting the lumbar plate 15B does not receive a body press as high as the body pressure by the waist, even if the body pressure of the occupant is applied to the back pad 20, the air passage is not completely squashed between the back pad 20 and the supporting spring 15A.

Also, for details, the lower side air passages 24D, 24D are formed to extend along the outer circumferential edge of the lumbar plate 15B. Specifically, the lower side air passages 24D, 24D are formed to be bent along the upper edge portion and left and right edge portions of the lumbar plate 15B such that the lower side air passages extend along the peripheral shape of the lumbar plate 15B. Further, the through-holes 24D1, 24D1 which are formed at the bent point portions of the lower side air passages 24D, 24D are formed close to positions right above the upper edge portion of the lumbar plate 15B, and the through-holes 24D2, 24D2 which are formed at the downward extending end portions of the lower side air passages 24D, 24D are formed close to positions immediately outside (horizontally adjacent to) the left and right edge portions of the lumbar plate 15B. That is, lower ends of the lower side air passages 24D, 24D are provided below an upper end of the lumbar plate 15B. Therefore, the lower side air passages 24D, 24D are formed at positions apart from the formation position of the lumbar plate 15B which receives a high body pressure from the occupant and close to the center where it is easy to send air to the body of the occupant.

Since the lower side air passages 24D, 24D are formed at positions deviated from the shape of the lumbar plate 15B, even if the body pressure of the occupant is applied to the back pad 20, the shape of each air passage is not squashed. The reason is that since most of the body pressure of the occupant applied to the back pad 20 is concentrically applied to and is supported by the lumber plate 15B, even if the lower side air passages 24D, 24D formed at the positions deviated from the lumbar plate 15B receive the body pressure, it is difficult for the lower side air passages 24D, 24D to be squashed.

As described above, air sent from the fan 40 is distributed widely in the in-plane direction of the back pad 20 by the air passage 24 formed in the rear surface of the back pad 20. Then, after passing through the air passage 24, the air is blown from the through-holes (the through-hole 24B1, the through-holes 24C1, 24C1, the through-holes 24C2, 24C2, the through-holes 24D1, 24D1, and the through-holes 24D2, 24D2) toward the outer surface of the back pad 20 (a surface on the side on which the occupant leans), and is blown to the back of the occupant through the skin material 30.

Meanwhile, the fan 40 is attached to the front surface of the upper bridging frame 13 of the back frame 10 as shown in FIG. 2. The fan 40 has a disk shape, suctions air from an inlet 40A directed to the front side, and blows the suctioned air out from the outlet 41A of the duct 41 attached to the lower portion of the fan 40. The outlet 41A of the duct 41 is connected and fixed to the connection opening 24A of the air passage 24 formed at the rear surface of the back pad 20, and blows the air blown out from the fan 40 toward the connection opening 24A. The basic configuration of the fan 40 is a known configuration which is, for example, same as those disclosed in JP-A-2009-291310, and thus will not be described in detail.

As described above, in the configuration of the vehicle seat 1 according to the present illustrative embodiment, the air passage 24 is formed at a position apart from the waist supporting portion 20Ba (central high-load portion) of the back pad 20. Therefore, even if the body pressure of the occupant is applied to the back pad 20, it is difficult for the air passage 24 to be squashed. In other words, when the body pressure is applied to the back pad 20, the waist supporting portion 20Ba on which the body pressure is particularly concentrated is largely squashed by supporting of the lumbar plate 15B of the support body 15. However, since the air passage 24 is formed at the position apart from the waist supporting portion 20Ba, it is difficult for the air passage 24 to be squashed. That is, by the simple configuration to devise disposition of the air passage 24, it is possible to form the air passage 24 such that it is difficult for the air passage to be squashed by pressure (backrest pressure) during sitting, without damaging a comfortable supporting property during sitting. In other words, if the surroundings of the air passage 24 are made excessively hard so as to prevent the air passage 24 from being squashed, the cushioning property when the occupant leans back against the seatback 2 is damaged. However, in the present illustrative embodiment, by the simple configuration to devise disposition of the air passage 24, it is possible to form the air passage 24 such that it is difficult for the air passage to be squashed by pressure (backrest pressure) during sitting, without damaging the comfortable supporting property during sitting.

Also, the support body 15 includes the lumbar plate 15B which is brought into surface contact with the waist supporting portion 20Ba of the back pad 20 from the rear surface, and the supporting spring 15A which elastically supports the lumbar plate 15B with respect to the back frame 10, and the air passage 24 is formed at the position apart from the waist supporting portion 20Ba of the back pad 20 which is surface-supported by the lumbar plate 15B. Therefore, even if the air passage 24 is provided to come at the installation area of the supporting spring 15A, it is difficult for the air passage 24 to be squashed. The reason is that a portion of the back pad 20 which is largely squashed if the back pad 20 receives the body pressure of the occupant is the waist supporting portion 20Ba supported by the lumbar plate 15B, and it is difficult for the portion supported by the supporting spring 15A to be squashed. Therefore, it is possible to improve the supporting property by the support body 15 while improving a ventilating function by freely providing the air passage 24 such that the air passage comes at the installation area of the supporting spring 15A.

Also, the air passage 24 is formed along the outer circumferential edge of the waist supporting portion 20Ba of the back pad 20. Therefore, it is possible to set the air passage 24 at the position close to the center where it is easier to send air to the body of the occupant. Therefore, it is possible to improve the ventilating function.

<Second Illustrative Embodiment>

Figure 7:
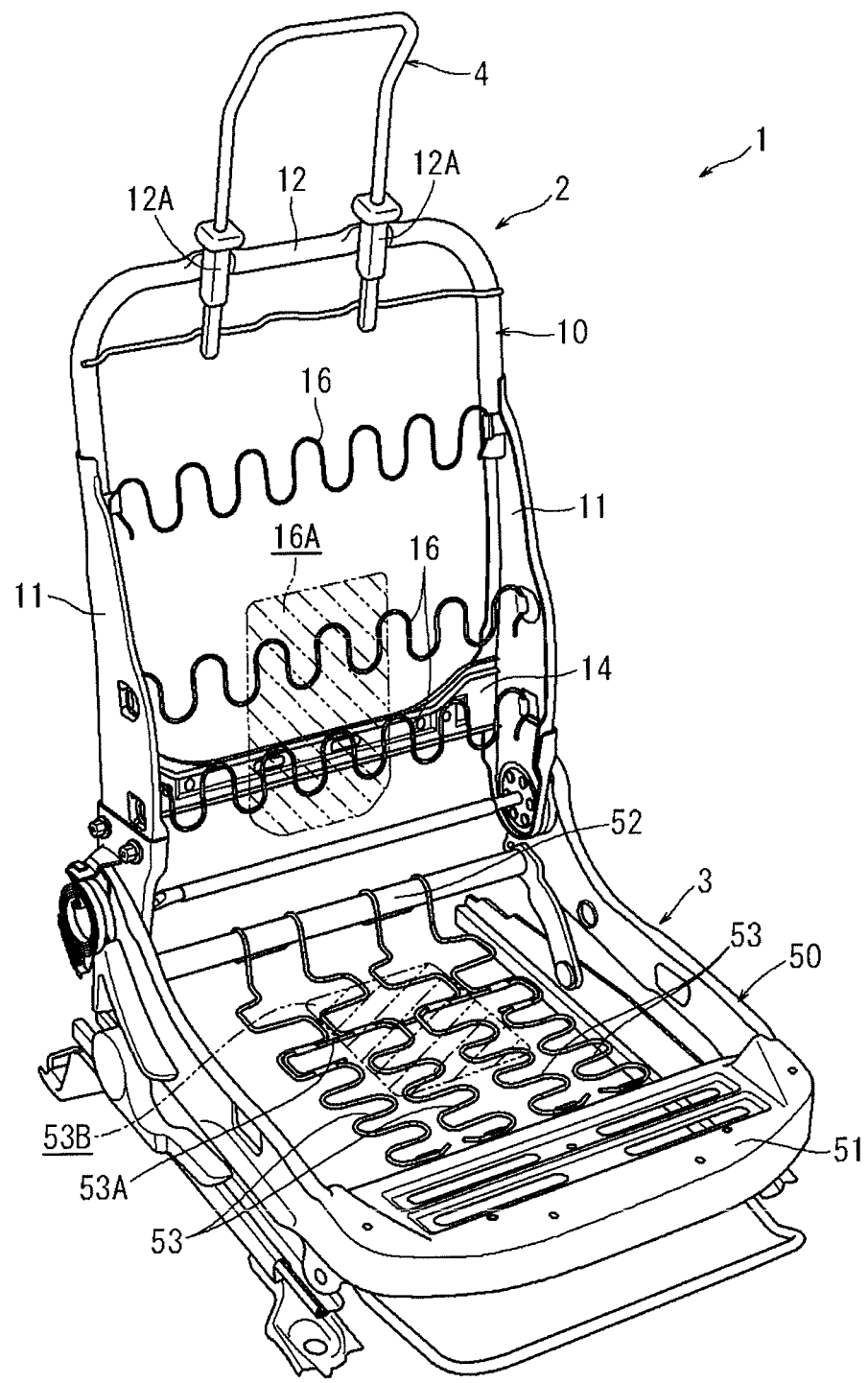
FIG. 7 is a perspective view illustrating a configuration of a vehicle seat according to a second illustrative embodiment.

Subsequently, the configuration of a vehicle seat 1 according to a second illustrative embodiment will be described with reference to FIG. 7. In the present illustrative embodiment, portions having the same configurations and operations as those of the vehicle seat 1 explained in the first illustrative embodiment will be denoted by the same reference numerals and will not be described, and a detailed explanation will be given to different portions. As shown in FIG. 7, the vehicle seat 1 according to the present illustrative embodiment includes three S springs 16 which are suspended in the width direction between the two side frames 11, 11 of the back frame 10 and elastically supports a pad (not shown), which serves as a cushion material and is provided inside the seat back 2, with respect to the back frame 10.

One of the S springs 16 is suspended in the width direction at a position of an upper center portion for supporting the upper portion of the back of the occupant such as the shoulder blades, and the other two are suspended in the width direction at heights for supporting the waist of the occupant and a portion right above the waist, respectively. The S springs 16 are formed to undulate like waves in the height direction, and are brought into wide contact with and elastically support the pad (not shown), which is provided on the front side, from the rear side by the shapes undulating like waves.

Due to the disposition of the S springs 16, when the occupant leans back against the seat back 2, portions of the pad (not shown) on which the waist and the shoulder blades are placed and the body pressure is particularly concentrated are supported directly from the rear side by the S springs 16, and a high supporting property (supporting force) is exhibited. Particularly, at the portion on which the waist of the occupant is placed, two S springs 16 are disposed, and the two S springs 16 support the body pressure of the waist of the occupant by a strong force.

The center portion of the two lower S springs 16 on which the waist of the occupant placed serves as a waist supporting area 16A is an example of a support body, and is a portion on which high body pressure is particularly concentrated. In the waist supporting area 16A, the high-load portion of the center of the pad (not shown) receiving the body pressure from the waist of the occupant is largely squashed toward the rear surface by supporting of the S springs 16. Therefore, in the present illustrative embodiment, although not shown, the air passage which is formed in the rear surface of the pad such that the air passage avoids the shapes of the S springs 16 passing through the waist supporting area 16A. Therefore, even if the body pressure of the occupant is applied to the pad, it is difficult for the air passage to be squashed. Therefore, it is possible to make air from a fan (not shown) flow dispersively and widely in the in-plane direction of the seat back 2. Also, in a case where the air passage is formed in the rear surface of the pad such that the air passage avoids the shapes of the S springs 16 passing through the waist supporting area 16A, the air passage may be provided to pass through the waist supporting area 16A. This is because if the air passage is provided to avoid the shapes of the S springs 16, it is difficult for the air passage to be squashed.

Also, in the vehicle seat 1 according to the present illustrative embodiment, although not shown, even in the seat cushion 3, a fan capable of sending air from the rear side to the body (femoral region and hip) of the occupant through the pad is provided. Here, the seat cushion 3 includes a cushion frame 50 which constitutes the skeleton of the seat cushion 3 and is assembled in a rectangular frame shape in a plan view, and four S springs 53 which are arranged in the width direction between a front frame 51 and a rear pipe frame 52 of the cushion frame 50 and can elastically support a pad serving as a cushion material (not shown) with respect to the cushion frame 50. The cushion frame 50 is an example of a seat frame, and is configured to support the peripheral portion of the mat type pad (not shown), which is provided on the cushion frame 50, from the rear side (the lower side).

The S springs 53 are collectively provided in the center area in the width direction on which the femoral region and hip of the occupant lean, and are configured to undulate like waves in the width direction and be brought into wide contact with and elastically support the pad (not shown), which is provided on the S springs 53, from the lower side by the shapes undulating like waves. The S springs 53 are formed such that every two wave forms adjacent to each other in the width direction undulate in opposite directions.

Due to the disposition of the S springs 53, when the occupant sits on the seat cushion 3, portions of the pad (not shown) on which the hip and the femoral region is placed and the body pressure is particularly concentrated are supported from the side just below the corresponding portions by the S springs 53 such that at the corresponding portions, a high supporting property (supporting force) is exhibited. Particularly, at the portion on which the hip of the occupant is placed, a connecting wire 53A is provided over the S springs 53 to integrally connect the S springs 53. Due to the connecting wire 53A, an input load is dispersively supported by the four S springs 53 such that the body pressure of the hip of the occupant is supported by a strong force.

The center portion of the S springs 53 where the connecting wire 53A is disposed and the hip of the occupant is placed serves as a hip supporting area 53B is an example of the support body, and is a portion on which a high body pressure is particularly concentrated. At this portion, the high-load portion of the center of the pad (not shown) receiving the body pressure is largely squashed by supporting of the S springs 53. Therefore, in the present illustrative embodiment, although not shown, the air passage is formed in the rear surface of the pad such that the air passage avoids the shapes of the S springs 53 and the connecting wire 53A passing through the hip supporting area 53B. Therefore, even if the body pressure of the occupant is applied to the pad, it is difficult for the air passages to be squashed. Therefore, it is possible to distribute air from the fan (not shown) widely in the in-plane direction of the seat cushion 3. Also, as long as the air passage is formed in the rear surface of the pad such that the air passage avoids the shapes of the S springs 53 and the connecting wire 53A passing through the hip supporting area 53B, the air passage may be provided to pass through the waist hip supporting area 53B. The reason is that if the air passage is provided to avoid the shapes of the S springs 53 and the connecting wire 53A, it is difficult for the air passage to be squashed.

Although the two illustrative embodiments of the present invention have been described above, the present invention can be embodied in various forms other than the above-mentioned illustrative embodiments. For example, in the first illustrative embodiment and the second illustrative embodiment, as portions on which the body pressure of the occupant is concentrated, the portions on which the waist and hip of the occupant are placed have been exemplified. However, it is also possible to set another portion on which the body pressure is concentrated, as an object portion, and to provide an air passage to avoid the object portion. For example, in a seat having a massage function to apply a partial pressing force to the back, femoral region, and the like of an occupant, it is possible to set a portion to which the pressing force of a pressing member having the massage function is applied, as an object portion on which a body pressure is concentrated, and provide an air passage to avoid the object portion. That is, the high-load portion of the center of the pad of the present invention is a center area inside the peripheral portion in the seat back or the seat cushion intended as a high-load portion on which the body pressure of an occupant is concentrated. A specific position to be the high-load portion is not particularly limited, and it is possible to set various positions as the object positions of the high-load portion as described above.

Also, the air passage needs only to extend in the in-plane direction with respect to the pad. The width, shape and size of the air passage are not particularly limited, and various forms of air passages can be applied. Further, the air passage may be formed to extend obliquely in the thickness direction with respect to the in-plane direction of the pad. Further, the form of the support body for elastically supporting the high-load portion of the center of the pad from the rear side is not limited to the forms described in the above-mentioned illustrative embodiments, and various forms of supporting structures for elastically supporting the pad with respect to the seat frame can be applied. For example, the support body may be provided with respect to a backboard integrally assembled with the back of the seat frame and elastically support the pad with respect to the seat frame through the backboard.

Also, in the second illustrative embodiment, as structures for elastically supporting the pads in the seat back and the seat cushion, the S springs have been exemplified. However, at the portions of the S springs on which the waist and hip of the occupant are placed, a side plate may be provided to be able to surface-support the high-load portion of each pad.

What is claimed is:

1. A vehicle seat for supporting a body of an occupant having an air passage that extends in an in-plane direction in a plane of a pad of a seat back of the vehicle seat, the plane being generally perpendicular to a front-rear direction of the vehicle seat, the vehicle seat comprising:
    a seat back frame which supports a peripheral portion of the pad from a rear side thereof in the front-rear direction of the vehicle seat; and
    a support body which is supported by the seat back frame and is configured to elastically support, from a rear side, a load concentration portion of a center of the pad,
    the support body including:
        a supporting plate which surface-contacts the load concentration portion of the pad from the rear side thereof in the front-rear direction of the vehicle seat; and
        a supporting spring which is configured to elastically support the supporting plate with respect to the seat back frame,
    wherein the air passage extends in the in-plane direction in the pad such that the air passage does not overlap the supporting plate in a thickness direction of the pad in the front-rear direction of the vehicle seat.

2. The vehicle seat according to claim 1, wherein the air passage is formed along an outer circumferential edge of the load concentration portion of the pad.

3. The vehicle seat according to claim 2,
    wherein the air passage includes lower side air passages which are provided at both sides with respect to the supporting plate to extend downward, and
    wherein lower ends of the lower side air passages are provided below an upper end of the supporting plate.

4. The vehicle seat according to claim 1,
    wherein the air passage is configured by a recess passage formed in a rear surface of the pad and covering the rear surface with a non-permeable cover sheet to have a closed passage in cross section, and
    wherein the cover sheet is provided to overlap the supporting plate of the support body.

5. The vehicle seat according to claim 1,
    wherein the supporting spring has a bent portion, and
    wherein the air passage includes a through-hole formed through the pad at the bent portion of the supporting spring.

6. The vehicle seat according to claim 1,
    wherein the air passage includes a through-hole formed through the pad at a position spaced from the load concentration portion of the pad.

7. The vehicle seat according to claim 1, wherein the load concentration portion of the pad is positioned at a lower side of the seat back frame such that the load concentration portion is capable of supporting a waist or a hip of a seated occupant.

8. The vehicle seat according to claim 1, the vehicle seat further comprising:
   a U-shaped supporting spring that supports the support body from a rear side thereof and includes a lower end portion that supports a lower area of the support body and an upper end portion that extends upward from an upper area of the support body and is attached to the seat back frame.

* * * * *